United States Patent [19]

Cambria

[11] Patent Number: 4,637,649

[45] Date of Patent: Jan. 20, 1987

[54] LATCH MECHANISM FOR REMOVABLE ROOF PANEL

[75] Inventor: Emanuel F. Cambria, Tannersville, Pa.

[73] Assignee: Cars & Concepts, Inc., Brighton, Mich.

[21] Appl. No.: 733,327

[22] Filed: May 13, 1985

[51] Int. Cl.[4] .......................... B60J 7/19; E05B 13/10; E05B 55/06

[52] U.S. Cl. .................... 296/224; 296/218; 70/221; 70/223

[58] Field of Search ................... 296/218, 224; 70/218, 70/221–223

[56] References Cited

U.S. PATENT DOCUMENTS

| | | | |
|---|---|---|---|
| 1,779,438 | 10/1930 | Lowe | 70/222 |
| 1,899,686 | 2/1933 | Henst | 70/222 |
| 1,899,996 | 3/1933 | Sullivan | 70/222 |
| 1,976,263 | 10/1934 | Miller | 70/222 |
| 2,021,565 | 11/1935 | Merideth et al. | 70/223 |
| 2,446,753 | 8/1948 | Floraday | 70/221 |
| 2,459,920 | 1/1949 | Clark | 70/223 |
| 4,047,408 | 9/1977 | Johns | 70/223 |
| 4,505,139 | 3/1985 | Richards | 70/221 |
| 4,540,215 | 9/1985 | Swearingen | 296/224 |

Primary Examiner—David A. Scherbel
Assistant Examiner—Dennis H. Pedder
Attorney, Agent, or Firm—Brooks & Kushman

[57] ABSTRACT

A latch mechanism for fastening a hatch panel in an automobile roof opening. The mechanism includes latch pins which extend and retract into and out of engagement with the roof structure to respectively fasten and release the hatch panel. An operator handle can be controlled by a key mechanism to function in either a locked mode or an unlocked mode. In the unlocked mode, movement of the handle to an open position retracts the latch pins, and movement to a closed position extends the pins. In the locked mode, the handle and latch pins are decoupled except upon the first occurrence of the handle being moved to its closed position so as to assure fastening of the hatch panel at all times after the handle is first moved to the closed position.

14 Claims, 11 Drawing Figures

LATCH MECHANISM FOR REMOVABLE ROOF PANEL

TECHNICAL FIELD

This invention relates to a latch mechanism for fastening a removable panel to the roof of an automobile.

BACKGROUND ART

The "T-roof" is a popular option with sporty automobiles. The "T-roof" design generally provides for removal of hatch panels on either side of the roof center line to open the passenger compartment from the top.

The hatch panels are typically provided with a latch mechanism to facilitate their installation and removal from the roof opening. It is desirable to be able to lock the latch mechanism so that the hatch panel is not removed without authorization when the vehicle is unattended.

An objective of the present invention is to provide a latch mechanism for a roof hatch panel which facilitates removal and installation of the panel but admits to secure fastening of the panel with a lock protect feature.

DISCLOSURE OF THE INVENTION

The present invention is a latch mechanism which functions in both an unlocked and a locked mode. In the unlocked mode, movement of an operator handle between a closed position and an open position respectively engages and disengages latch pins from the roof structure. In the locked mode, the operator handle is decoupled from the latch pins and movement of the handle results in no corresponding movement of the latch pins. The locked and unlocked modes may be selected by use of a key mechanism which cooperates with the operator handle.

A key feature of the invention is that the latch pins will be extended and in engagement with the roof structure when the latch mechanism is placed in the locked mode. More specifically, the decoupling of the operator handle with the latch pins upon selecting the locked mode does not occur until the operator handle has been returned to its closed position. Upon obtaining the closed position, the latch pins are extended and engaged with the roof structure, and thereafter movement of the operator handle effects no corresponding movement of the latch pins while in the locked mode. This feature assures that with the hatch panel in position in the roof opening and the handle closed, the latch pins will always be extended, irrespective of whether the latch mechanism is in the locked mode or the unlocked mode.

In broad terms the controlled coupling of the operator handle with the latch pins is accomplished through a mechanical cam and clutch connection. The unlocked mode is obtained by rotating the cam to a first set position by a key mechanism or the like. In a first position, the cam transmits motion of the operator handle through a clutch which contacts a working face of the cam. The clutch, in turn, provides linkage to the latch pins and translates movement of the operator handle into corresponding retraction and extension of the latch pins. In the locked mode, the control cam assumes a second position and is decoupled from the clutch, but the clutch is positioned to extend the latch pins as the handle is first moved to the closed position. Thereafter, movement of the operator handle between its closed position and its open position while in the locked mode will not be transmitted to the clutch and will cause no corresponding extension or retraction of the latch pins.

These and other features and advantages of the present invention will become readily understood in light of the following detailed description.

BEST MODE FOR CARRYING OUT THE INVENTION

Figure 1:
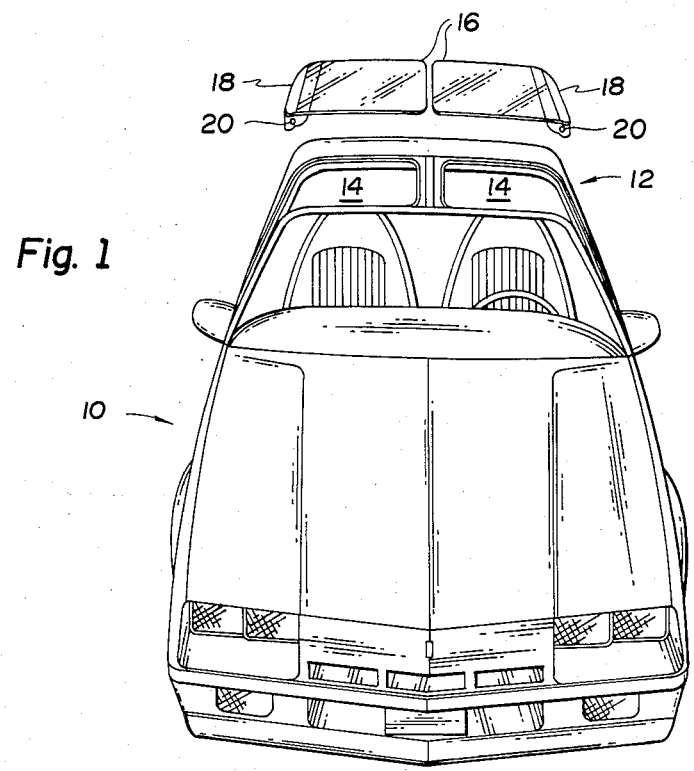
FIG. 1 is a front perspective view of a sporty vehicle having a "T-roof" with removable hatch panels.

FIG. 1 illustrates a sporty automobile 10 outfitted with a "T-roof" 12. The T-roof 12 features hatches 14 in the roof structure. Each hatch 14 has a respective hatch panel 16. At the outboard edge of each hatch panel 16 is a rail 18 which provides structural support for the panel and includes a latch mechanism for fastening the panel in place in the complementary hatch 14 or releasing it for removal from the "T-roof" 12.

Figure 2:
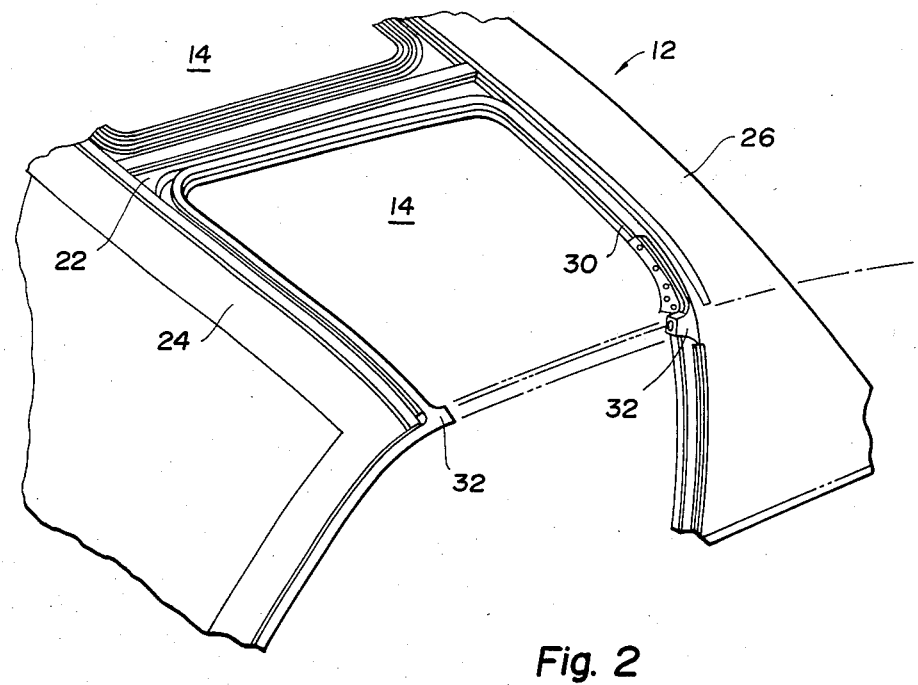
FIG. 2 is a side perspective view of the automobile of FIG. 1 showing the "T-roof" opening in greater detail.

FIG. 2 is an enlarged view of a major portion of the "T-roof" 12 as depicted in FIG. 1. The hatches 14 are divided by a central strut 22 which interconnects the windshield header 24 and the rear roof portion 26. Each hatch 14 is fitted with a drainage seal 30 which may be of the type disclosed in U.S. Pat. No. 4,475,766. At the fore and aft outboard corners of the hatch 14 are a pair of sockets 32 which accept the pins 20 in the rail 18 (shown in FIG. 1) to fasten the panel 16 in place.

Figure 3:
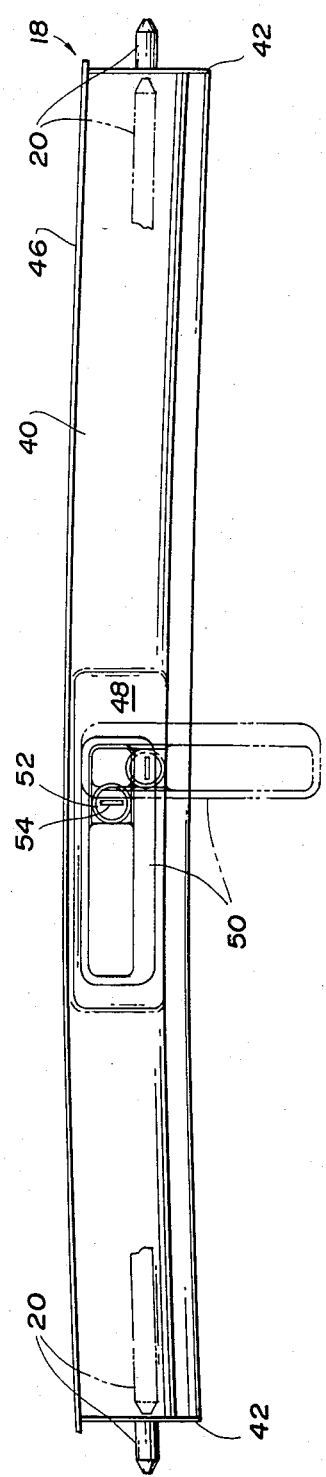
FIG. 3 is a first view of the latch mechanism of the present invention illustrating its operation in the unlocked mode.
Figure 4:
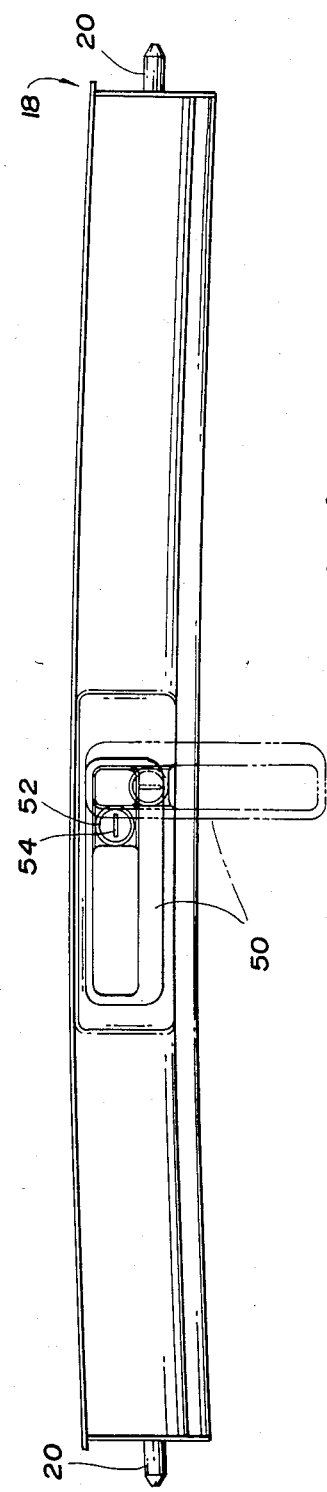
FIG. 4 is a second view of the latch mechanism of the present invention illustrating its operation in the locked mode.

FIGS. 3 and 4 are similar plan views of the frame rail 18 in its respective unlocked and locked modes of operation.

With reference to FIG. 3, the rail 18 comprises an elongated plastic housing 40 spanning the longitudinal dimension of the hatch 14. Each of the opposed ends of the housing 40 has an end closure 42. At the left edge of the housing 40 is shown an abbreviated portion of the glass 46 or other transparent sheet material which is used to cover the hatch.

The housing 40 is formed with a central recess or well 48. An operator handle is mounted in the well 48 and serves to control the retraction and extension of the latch pins 20 when operated in its unlocked mode, as will be described hereinafter in greater detail. The handle 50 is movable between a closed position which corresponds to extension of the latch pins 20, and an open position, shown in phantom, which corresponds to retraction of the latch pins.

The operating mode of the handle 50 is controlled by a key mechanism 52. In FIG. 3, the key mechanism 52 is unlocked, as represented by the key slot 54 being positioned transversely with respect to the longitudinal axis of the handle. In FIG. 4, the key mechanism 52 is shown in its locked mode, as represented by the key slot 54 being aligned with the longitudinal axis of the handle 50.

In FIG. 4, it can be observed that with the key mechanism 52 in its locked mode, the handle 50 is decoupled from the pin 20, and movement of the handle 50 between its closed position and its open position (shown in phantom) does not effect corresponding movement of the pins 20.

Figure 5:
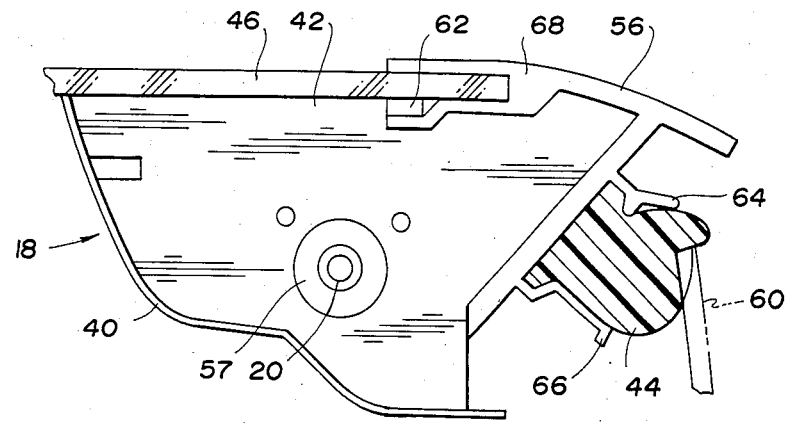
FIG. 5 is an end view of the latch mechanism of FIGS. 3 and 4.

FIG. 5 is an end view of the rail 18. In this view the inboard is at the left, and the outboard is at the right.

The plastic housing is on the inboard side of the rail and exposed within the interior of the vehicle for operator access to the handle described in relation to FIGS. 3 and 4. The outboard side of the rail 18 is enclosed by an extruded frame piece 56. The frame piece 56 includes integral projecting fingers 64 and 66 which carry a weather seal 44 for the side door window 60. The upper surface of the frame piece bifurcates at 68 to define a slot for receiving the glass 46 which covers the hatch. A shim 62 assures a secure fitting of the glass 46 in the slot.

The end closure 42 covers the surface area bounded by the housing 40, frame piece 56 and glass 46. The end closure includes an aperture 57 for a reciprocal movement of the pin 20 between its extended and retracted positions.

Figure 6:
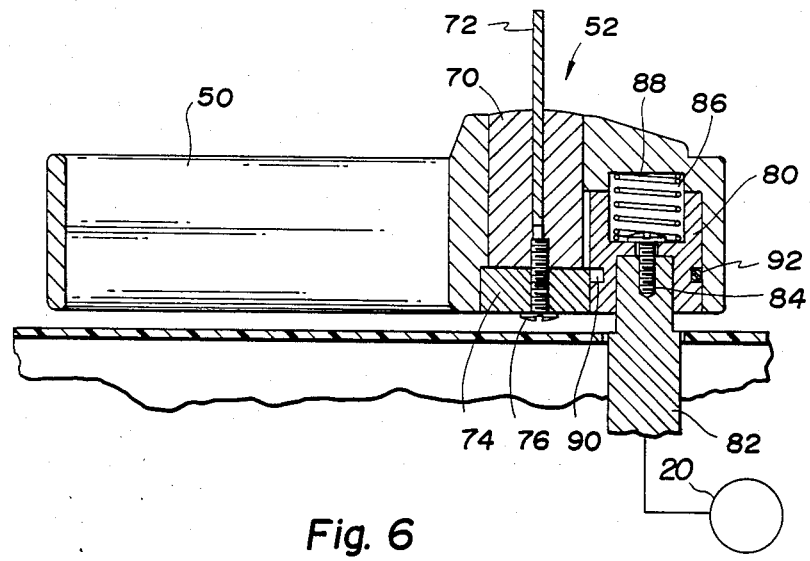
FIG. 6 is a sectional view taken along the longitudinal axis of the latch handle.

FIG. 6 is a sectional view taken through the handle 50 illustrating the assembly of mechanical components associated with the operator handle 50.

The key mechanism, indicated generally at 52, is shown to comprise a cylinder 70 adapted to receive a key 72. The cylinder 70 is connected by a threaded fastener 76 to a control cam 74 for co-rotation of the control cam with the cylinder. Thus, selective rotation of the cylinder 70 aligns first and second cam surfaces 100 and 112 in a fixed position relative to the handle 50 so as to face a clutch 80 as will be described in greater detail hereinafter.

The control cam 74 can be selectively coupled to and decoupled from a clutch 80. The clutch 80 is in turn solidly connected to a drive stud 82 by a threaded fastener 84. The clutch 80 has a central recess 86 formed in its upper portion to house a compression spring 88 which is placed under load to prevent play in the mechanical connection of the components. The clutch 80 also has an annular groove 90 which serves two functions. First, the groove 90 accepts a pin 92 which extends through an aligning aperture in the handle to lock the handle to the clutch. Secondly, the groove 90 provides clearance for elements 106 and 108 on the control cam 74 seen more clearly in FIGS. 7-11.

The mechanical linkage of the stud 82 to the pins 20, shown diagrammatically in FIG. 6, can be by any conventional mechanical arrangement, such as by a rack-and-pinion arrangement.

FIGS. 7-11 sequentially illustrate the operation of the latch mechanism of the present invention in its unlocked and locked modes. An important feature of the invention is that the pins always default to their extended positions and remain in that position following the first occurrence of the handle being placed in its closed position while in the locked mode. This feature assures that closing of the handle will cause latching of the hatch panel to the automobile roof irrespective of the operating mode of the key mechanism. Without this feature, inadvertence or inattention to the operating mode of the key mechanism could allow the pins to be retracted even though the handle is closed.

Figure 7:
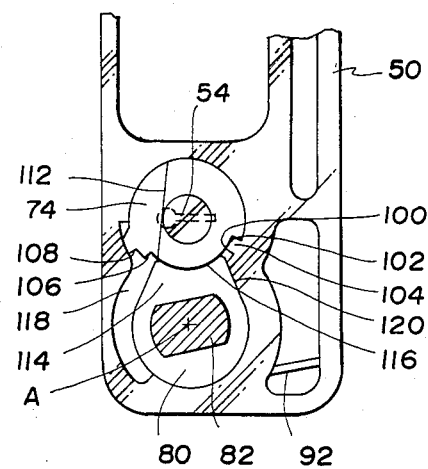
FIG. 7 is a bottom plan view, in section, showing the handle in its open position in the unlocked mode of the mechanism.

In FIG. 7 the handle 50 is shown in its open position and functioning in its unlocked mode. This is signified by the key slot 54 being aligned transversely to the longitudinal axis of handle 50.

In this state, the control cam 74 and the clutch 80 are mechanically coupled such that rotational movement of the handle 50 to its closed position will cause rotation of the drive stud 82 about its axis A.

As can be seen in greater detail in FIG. 7, the control cam 74 includes a convex work surface 100 which mates with a complementary concave work surface 116 on a lobe 114 of the clutch 80. The cam work surface 100 is bounded on the right by a step 102. The step 102 contacts an integral stop 104 in the handle to positively limit clockwise movement of the control cam to the position shown in FIG. 7.

Figure 11:
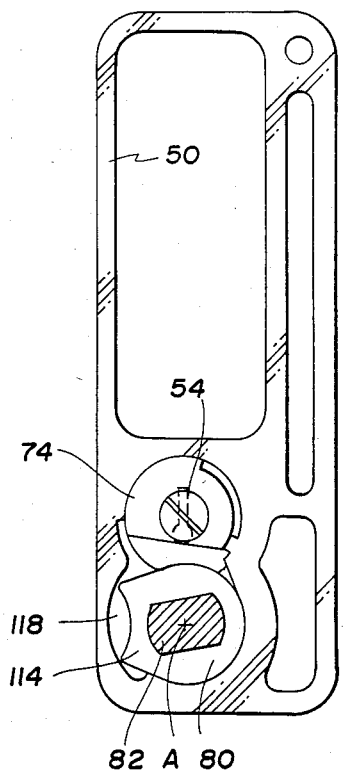
FIG. 11 is a bottom plan view of the handle in the open position in the locked mode.

The work surface 100 terminates at its left side in first and second steps 106 and 108. The step 108 similarly provides a positive limit to counter-clockwise rotation of the control cam 74 when it engages a corner portion of the reaction wall 120 as step 106 abuts against the stop 104 as shown in FIG. 11.

The control cam 74 also includes a flat surface 112. As will be shown and described in connection with FIGS. 9-11, the flat recessed surface 112 serves to mechanically decouple the control cam 74 from the clutch 80 in the locked mode.

Figure 8:
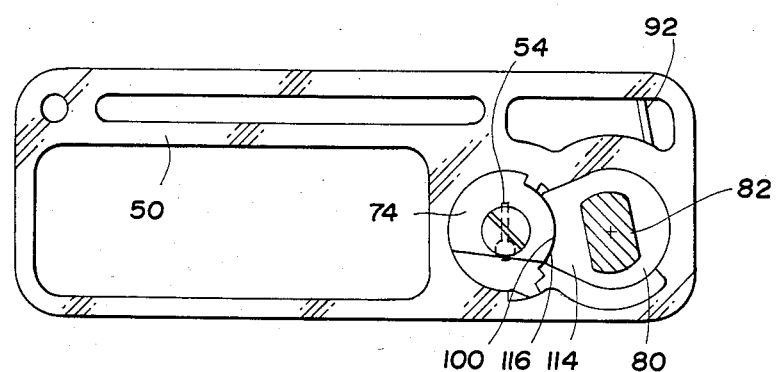
FIG. 8 is a plan view similar to FIG. 7 showing the handle in its closed position in the unlocked mode.

The pin 92 which functions to secure the handle 50 from vertical displacement from the clutch 80, as referred to in connection with the description of FIG. 6, is shown extending through the handle in FIGS. 7 and 8.

The configuration of the handle 50 includes a cavity 118 bounding the clutch on its left hand side. The cavity 118 serves to stow the clutch in an inoperative position when the mechanism is in the locked mode, as will hereinafter become apparent in connection with the description of FIG. 11.

In operation, rotation of the handle 50 causes the right side of the lobe 114 to react against a surface 120 and impart rotary movement to the solidly connected stud 82. FIG. 8 illustrates the movement of the stud 82 in correspondence with the movement of the handle 50 from its open position to its closed position. As seen in FIG. 8, the work surface 100 on the cam 74 is coupled to the mating work surface 116 on the lobe 114 of the clutch 80. The alignment of the key slot 54 in transverse relation to the handle axis confirms that the handle is operating in its unlocked mode. The rotation of the stud 82 actuates the extension of the latch pins 20.

Figure 9:
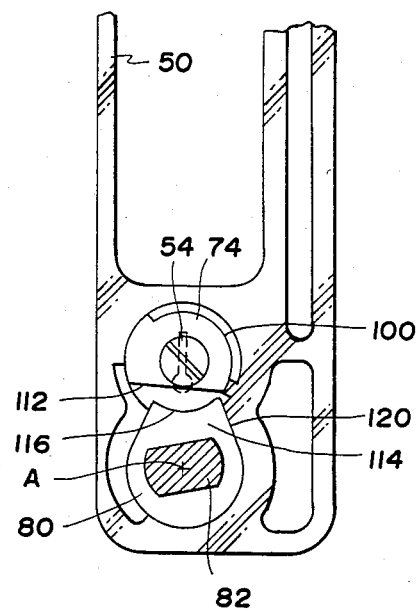
FIG. 9 is a bottom plan view, in section, of the handle in the locked mode preparatory to an initial movement from the open position to the closed position.

FIG. 9 illustrates the handle 50 in its open position but in the locked mode, as signified by the alignment of the key slot 54 with the handle axis. In the locked mode, the control cam 74 is rotated counter-clockwise one quarter revolution. This moves the work surface 100 on the cam 74 out of coupled relation with the work surface 116 on the lobe 114 of the clutch 80. Instead, the work surface 116 faces the flat surface 112 on the control arm 74 cam the mechanism connection of the clutch 80 and the control cam 74 is interrupted.

Figure 10:
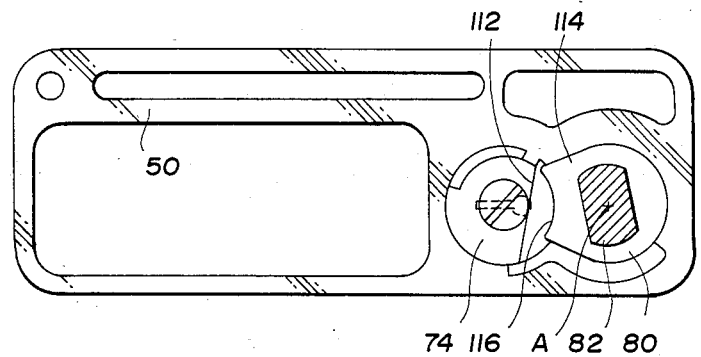
FIG. 10 is a bottom plan view of the handle in the closed position in the locked mode.

However, movement of the handle 50 from its open position in FIG. 9 to its closed position in FIG. 10 will nonetheless effect rotation of the clutch 80 and stud 82 about the axis A. The right side of the cam lobe 114 remains in abutting relation with the reaction surface 120 of the handle. Accordingly, movement of the handle 50 to its closed position will cause corresponding rotation of the clutch 80.

This feature assures that the latch pins will always be extended and in engagement with the automobile roof when the handle 50 is moved to its closed position in the locked mode. However, subsequent movements of the handle 50 between the closed and open position will not affect corresponding movement of the latch pins.

More specifically, in FIG. 10 it can be seen that the clutch 80 and control cam 74 are decoupled. Consequently, movement of the handle 50 from its closed position shown in FIG. 10 to its open position shown in FIG. 11 effects no corresponding movement of the clutch 80, i.e. the clutch 80 remains stationary. The lobe 114 on the clutch 80 is stowed in the cavity 118. Moreover, there is no rotation of the stud 82 about its axis A, which signifies that the latch pins 20 remain extended and in engagement with the automobile roof.

The handle 50 will continue to have free movement relative to the clutch 80 and stud 82 until the key mechanism is returned to its unlocked mode in the configuration shown in FIG. 8.

The invention has been described in an illustrative embodiment, and the words used herein have been for purposes of description rather than limitation. Alternative embodiments of the invention may suggest themselves to persons of skill in the art without departing from the scope of the appended claims.

What is claimed is:

1. A latch mechanism for fastening a hatch panel in a complementary roof opening in the roof of an automobile comprising:
    latch means carried by the hatch panel for selectively interlocking the hatch panel with respect to the automobile roof within the roof opening;
    operator means for actuating said latch means having an operator member and means for displaceably mounting said member to the latch panel for movement between a closed position corresponding to engagement of the latch means, and an open position corresponding to disengagement of the latch means; and
    control means carried by the operator means for selectively coupling said latch means to said operator means in an unlocked mode corresponding to direct interconnection of said operator member and said latch means and a locked mode corresponding to limited interconnection of said operator member and said latch means, said control means having:
        a first means for coupling the latch means and the operator member when the unlocked mode of said control means is selected to effect movement of the latch means in correspondence to the movement of the operator member;
        a second means for locked mode coupling of said latch means and said operator member in response to movement of the operator member from the open position; and
        a third means for locked mode decoupling of said latch means and said operator member during subsequent movement of said operator member.

2. The latch mechanism of claim 1 wherein the latch means comprises at least one reciprocable member engageable with the automobile roof.

3. The latch mechanism of claim 2 wherein the reciprocable member comprises a pin having movement between a retracted position and an extended position.

4. The latch mechanism of claim 1 wherein the operator member comprises a handle movable between the open and closed positions.

5. The latch mechanism of claim 4 wherein the handle is rotatable between the open position and the closed position.

6. The latch mechanism of claim 1 wherein the control means includes a key mechanism for selection of the locked mode or the unlocked mode.

7. The latch mechanism of claim 1 wherein the control means includes a control cam selectable between a first position corresponding to the unlocked mode and a second position corresponding to the locked mode.

8. The latch mechanism of claim 7 wherein the control means further comprises a clutch connected to the latch means and adapted to couple to the control cam when the cam is in its first position for corresponding movement therewith, and adapted to decouple from the control cam when the control cam is in its second position.

9. The latch mechanism of claim 8 wherein the clutch is movable in relation to the operator member between a working position for coupling with the control cam, and a stowed position decoupled from the control cam.

10. The latch mechanism of claim 9 wherein the operator member includes a reaction surface adopted to contact the clutch when in its working position to transmit motion of the operator means to the clutch means when the operator means is moved from its open position to its closed position.

11. The invention as defined in claim 8 wherein said clutch includes a work surface adapted to matingly engage said control cam when said cam is in its first position, wherein said clutch also includes a side surface, and wherein said operator member includes a reaction surface mating with said side surface as said operator member is moved from its open position to its closed position.

12. The invention as defined in claim 1 wherein said control means comprises a control cam having a first cam surface and a second, recessed cam surface circumferentially spaced from said first cam surface, and means for movably mounting said cam in said operator member so that one of said first and second surfaces can be selectively aligned in a fixed position with respect to said operator member.

13. The invention as defined in claim 12 and further comprising:
    a clutch connected to the latch means and having a work surface adapted to engage said first cam surface, and having a second peripheral engagement surface, and means for movably mounting said clutch in said operator member so that said work surface can be selectively positioned at said fixed position for engagement with said first cam surface.

14. The invention as defined in claim 13 wherein said operator member includes a reaction surface positioned to abut against said second engagement surface as said operator member is moved from its open position to its closed position.

* * * * *

UNITED STATES PATENT AND TRADEMARK OFFICE
CERTIFICATE OF CORRECTION

PATENT NO. : 4,637,649

DATED : January 20, 1987

INVENTOR(S) : Emanuel F. Cambria

It is certified that error appears in the above-identified patent and that said Letters Patent is hereby corrected as shown below:

Col. 5, Line 1, "arm" should be --cam--;

Col. 5, Line 1, "cam" should be --and--;

Col. 5, Line 1, "mechanism" should be --mechanical--;

Col. 5, Line 47, "latch" before "panel" should be --hatch--.

Signed and Sealed this

Twenty-first Day of April, 1987

*Attest:*

*Attesting Officer*

DONALD J. QUIGG

*Commissioner of Patents and Trademarks*